Patented Aug. 12, 1941

2,252,555

UNITED STATES PATENT OFFICE 2,252,555

POLYMERIC MATERIAL

Wallace Hume Carothers, deceased, late of Wilmington, Del., by Wilmington Trust Co., Wilmington, Del., executors, assignors to E. I. du Pont de Nemours and Company, Wilmington, Del., a corporation of Delaware No Drawing. Application April 4, 1939, Serial No. 266,014

11 Claims. (Cl. 260—78)

This invention relates to synthetic polymeric materials, and more particularly to synthetic linear interpolyamides.

The present application is a continuation-in-part of application Serial Number 74,811, now U. S. Patent No. 2,190,770 filed April 16, 1936, which is a continuation-in-part of abandoned application Serial Number 34,477, filed August 2, 1935 which in turn is a continuation-in-part of U. S. Patent 2,130,523, filed January 2, 1935, and U. S. Patent 2,071,250, filed July 3, 1931.

Synthetic linear polyamides are those obtainable from diamines and dibasic acids or from polymerizable amino acids, as described in Patents 2,071,250, 2,071,253, and 2,130,948. The simple polyamides of these types, i. e., those derived from a single diamine and dibasic carboxylic acid or from a single amino acid, are characterized by high melting point, pronounced crystallinity, and insolubility in most solvents except mineral acids, formic acid, and the phenols. These properties, together with good thermal stability, great strength, and excellent elasticity, make these products of great value for the preparation of textile fibers. These same properties, however, make it difficult to prepare clear sheets from these polyamides or to use the polyamides in coating compositions and other applications which require the use of a solvent. Acids and phenols cannot be used advantageously as solvents in coating compositions and the like. Interpolyamides prepared from diamines and dibasic carboxylic acids, as for instance from two diamines and one dibasic carboxylic acid more closely resemble the simple polyamides than the aminoacid-diamine-dibasic carboxylic acid interpolyamides described herein. Although the four component diamine-dicarboxylic acid interpolyamides in some respects resemble the three component interpolyamides of the present invention, it is desirable for economic and other reasons to limit the reactants as much as possible.

This invention has as an object the preparation of new fiber-forming polyamides. A further object is the preparation of interpolyamides having wider solubility characteristics and less pronounced crystallinity than the simple polyamides. Other objects will appear hereinafter.

These objects are accomplished by heating to reaction temperature at least three polyamide-forming reactants, at least one of which is a diamine having at least one hydrogen atom attached to each amino nitrogen atom, at least one of which is a dibasic carboxylic acid, and at least one of which is a polymerizable amino acid, and continuing the heating until a polymer of the desired properties is obtained. This heating is usually continued until the polymeric product obtained is capable of being formed into continuous filaments which can be further cold drawn into oriented fibers. The diamine and dibasic acid may be previously combined into the salt which is considered as representing two polyamide-forming reactants. The invention for simplicity is described particularly in connection with the dibasic carboxylic acids and with the amino acids. In place of dibasic carboxylic acids there may be used, however, their amide-forming derivatives, as for instance the esters, half-esters, acid halides, anhydrides, or amides; and likewise in place of the amino acids there may be used their amide-forming derivatives, as for instance the lactams, esters, acid halides and amides. It is to be understood, therefore, that these derivatives are intended to be included by the mention, in the specification and claims, of the dibasic carboxylic acids and the amino acids.

In the preferred practice of the invention one primary diamine, one dibasic carboxylic acid, and one polymerizable monoaminomonocarboxylic acid are heated at amide-forming temperatures, generally in the range of 180–300° C., until the product has a sufficiently high molecular weight to exhibit fiber-forming properties. As in the case of the simple polyamides, the fiber-forming stage can be determined by touching the molten polymer with a rod and drawing the rod away; if this stage has been reached, a continuous filament of considerable strength and pliability is formed. This stage is generally reached when the polyamide has an intrinsic viscosity of at least 0.4, where intrinsic viscosity is defined as given in Patent 2,130,948. In general, measurement of the intrinsic viscosity will be the most convenient method to determine when the desired degree of polymerization has been attained. The interpolymers of this invention do not acquire the properties desired for most uses until they reach the fiber-forming stage. In other words, great strength, toughness, pliability, etc. are properties which are intimately related to the fiber-forming property.

When the salt of a diamine and dibasic acid is used the conversion to the interpolyamide is carried out in the same manner as the preparation of simple polyamides from a diamine-dibasic salt alone as described in the above mentioned patent. The reaction is carried out by heating the mixture of salt and amino acid at amide-forming temperatures, generally between 180–300° C. in the presence or absence of a diluent and under conditions which will permit the water formed in the reaction to escape, at least during the last stages of the reaction, until examination of a test portion of the product indicates that it has the desired fiber-forming properties. As examples of solvents which may be used in the reaction may be mentioned phenol, the cresols, the xylenols, diphenylolpropane, and o-hydroxydiphenyl. White medicinal oil is an example of a non-solvent which may be used. The reaction can also be carried out advantageously in water.

The polymerization reaction whereby the interpolymers of this invention are made can be carried out at atmospheric, superatmospheric, or subatmospheric pressure. The last stages of the reaction, at least, should be carried out under conditions which permit the escape of the by-product formed in the reaction, unless this by-product is a phenol. This is generally done by operating at atmospheric or reduced pressure during the last stages of the reaction. Preferably the reaction is carried out in the absence of oxygen, e. g., in an atmosphere of nitrogen or in a vacuum. An antioxidant may be added if desired.

The interpolyamides possessing the most desirable properties are those prepared from 6-aminocaproic acid, diprimary diamines having a radical length of 8 to 14, and dibasic carboxylic acids having a radical length of 6 to 12, the molar ratio of the amino acid ranging from 10 to 90% of that of the diamine, the diamine and dibasic acid being used in substantially equimolecular amounts. The term "radical length" is used as defined in Patent 2,130,948.

The following examples, in which parts are by weight, are illustrative of the methods used in practicing the invention:

EXAMPLE I

A mixture of 7.5 parts of 6-aminocaproic acid and 2.5 parts of 2,5-dimethylhexamethylene diammonium alpha,alpha'-dimethyl-adipate (M. P. 158–160° C.) was heated in an evacuated, sealed tube for 2 hours at 210–230° C. The low polymer obtained was then heated for 2 hours more at 220–240° C. under a pressure of 2 mm. The product thus obtained was a clear, pseudo-resinous, tough polymer. It had an intrinsic viscosity of 0.53 and could be spun into fairly strong filaments. The interpolymer melted at 110–115° C. (in fiber form). It was soluble in alcohols and mixtures of alcohols with halogenated hydrocarbons, such as methanol-chloroform, methanol-$\beta$-trichloroethanol, and methanol-trichloroethylene mixtures. It was also soluble in unsaturated alcohols, such as methallyl alcohol. It was also soluble in the usual polyamide solvents, i. e. formic acid and phenols.

EXAMPLE II

A mixture of 7 parts of 6-aminocaproic acid and 3 parts of hexamethylene diammonium terephthalate (M. P. 273–275° C.) was heated in a closed vessel for 1.5 hours at 240–250° C. The vessel was then opened and heated for 2 hours more with a current of dry nitrogen bubbling through the molten mass. The interpolyamide obtained was a tough, pseudo-resinous solid which melted at 162–165° C. It had an intrinsic viscosity of 0.78 and could be spun into filaments capable of being cold drawn into oriented fibers. Molded films of this material were quite clear and pliable. The interpolymer possessed solubility characteristics similar to the preceding interpolymer, being soluble in alcohols, alcohol-chlorinated hydrocarbon mixtures, besides the customary polyamide solvents.

EXAMPLE III

A mixture of 6 parts of 10-aminocaproic acid, 4 parts of hexamethylenediamine-adipic acid salt, and about 0.01 part of acetic acid (viscosity stabilizer) was heated in a sealed tube for 1.5 hours at 240–250° C. and then at atmospheric pressure for an equal time at 255° C. The resultant interpolymer was transparent, had a melting point of 125–130° C., and an intrinsic viscosity of 0.79. It could be spun readily into filaments which could be cold drawn.

EXAMPLE IV

A mixture of 5 parts of methyl caprolactam (obtained by isomerization of 3-methyl cyclohexanone oxime), 5 parts of hexamethylene diammonium adipate, and 0.5 part of water was heated for 24 hours in a sealed tube at 250° C. and then for 2 hours at 255° C. at atmospheric pressure in an oxygen-free atmosphere. The interpolymer had a softening point of about 65° C. and an intrinsic viscosity of 0.7.

EXAMPLE V

Equimolecular quantities of 6-aminocaproic acid, hydrazine, and octadecanedioic acid were heated together at 200° C. under atmospheric pressure for about one hour and then for 2 hours at 255° C. under 1 mm. absolute pressure. The resultant interpolymer had a melting point of 125–130° C. and could be formed into filaments.

EXAMPLE VI

A mixture of 374 parts of decamethylene diammonium sebacate (M. P. 178–180° C.), 262 parts of hexamethylene diammonium adipate and 131 parts of 6-aminocaproic acid was heated in an evacuated, sealed tube for two hours at 210–225° C. The tube was then opened and heated for two hours more at 220–240° C. under a pressure of 2 mm. The interpolymer thus obtained was a clear, pseudo-resinous solid which melted at 120–125° C. (in fiber form). The interpolymer was soluble in alcohols, alcohol-halogenated hydrocarbon mixtures, ethanol-toluene as well as in the usual polyamide solvents. It had an intrinsic viscosity of 0.89 and could be spun into filaments capable of being cold drawn. Films, sheets, etc., of the material were quite tough, transparent and pliable.

A large number of valuable interpolymers can be prepared in accordance with the process of this invention, since the number of combinations possible is very large. In the table below are given the melting points of typical fiber-forming interpolymers, prepared by copolymerization of the ingredients indicated.

TABLE

*Aminoacid interpolyamides*

| Derived from— | | Weight ratio of amino acid to salt | Melting range, °C. |
|---|---|---|---|
| Amino acid | Salt (D=diammonium) | | |
| 6-aminocaproic | Decamethylene D. adipate. | 10:90 | 209–210 |
| Do | Decamethylene D. sebacate. | 60:40 | 140–142 |
| Do | 3-ter-butylhexamethylene D.$\beta$-ter. butyladipate. | 75:25 | 105–110 |
| Do | Hexamethylene D. terephthalate. | 90:10 | 177–180 |
| Do | ----do---- | 80:20 | 165–170 |
| Do | ----do---- | 60:40 | 170–175 |

Instead of preparing the interpolymers of this invention from monomeric reactants as illustrated in the foregoing examples, they can also be prepared from simple polyamides. This can be done by heating a polyamide derived from a polymerizable aminoacid and a simple polyamide derived from a diamine and a dibasic acid with water or alcohol under pressure, preferably at a temperature between 180–300° C. Under these conditions, partial hydrolysis of the polyamides takes place with the formation of low polyamides and some monomeric reactants, the extent of hydrolysis depending upon the temperature and the quantity of water or other hydrolytic agent used. The water or other hydrolytic agent is then permitted to escape, preferably at a temperature sufficiently high to keep the reaction mass fluid, and the heating continued at amide-forming temperatures. This causes the hydrolysis products (chiefly low molecular weight polyamides) to reunite and in so doing they form an interpolymer.

The polyamide-forming reactants which may be used in making the interpolyamides of this invention are those useful in the preparation of simple polyamides. The preferred reactants are amino acids represented by the general formula $R'''$—NH—$R''$—COOH in which $R'''$ is an univalent organic radical or hydrogen and $R''$ is a divalent hydrocarbon radical having a chain length of at least five carbon atoms, and diamines of the formula $NH_2CH_2RCH_2NH_2$, and dicarboxylic acids of the formula $HOOCCH_2R'CH_2COOH$, in which R and R' are divalent hydrocarbon radicals and in which R has a chain length of at least two carbon atoms. Preferably R and R' contain from 2 to 8 carbon atoms.

The application of the present invention has been found to be of particular value in the production of interpolymers from three components which consist of 6-aminocaproic acid, hexamethylene diamine, and adipic acid; which particular interpolymers, however, are the invention of Edward Peter Czerwin and form the subject matter of his application S. N. 266,001, filed concurrently herewith and assigned to the assignee hereof. As previously indicated, the amino acid may be replaced by its lactam or other derivatives and the two acids mentioned may be replaced by other amide-forming derivatives. Aromatic reactants, for instance, isophthalic and terephthalic acids are also useful ingredients. If desired, various modifying agents such as plasticizers, pigments, resins, delusterants, etc., may be added before, during or after the polymerization.

For certain purposes, it is desirable that the interpolymers be viscosity-stable, i. e., do not alter appreciably in viscosity (molecular weight) when heated at their melting points. Viscosity stable interpolymers can be prepared by using a small excess (up to 5 molar per cent) of the diamine or dibasic acid reactants or by incorporating in the reaction mixture a small amount, generally 0.1–5% of a monoamine or a monocarboxylic acid or derivative thereof. Acetic acid and stearic acids are typical viscosity stabilizers of this class.

The interpolyamides of the present invention overcome the drawbacks of the simple polyamides without sacrificing desirable properties such as good thermal stability, strength, and pliability. The present interpolyamides have much lower melting points than the corresponding simple polyamides and are less markedly crystalline. This lower crystallinity is evidenced by the following facts: (1) X-ray diagrams of the interpolymers show a fainter crystalline pattern than in the case of the simple polyamides, (2) the interpolymers are more resinous in character than the simple polymers, (3) melt over a wider range, (4) give clearer films, i. e., films in which the crystallinity is much less apparent.

Another difference between the interpolyamides and the simple polyamides is that cold drawn filaments of the former tend to retract when heated at temperatures considerably below their melting points. This property gives the interpolymers interesting felting qualities. The interpolyamides are further characterized by greater solubility in organic solvents than the simple polyamides, and as compared to the diamine-dibasic acid type of interpolyamides the present interpolyamides are advantageous because only three components are required to obtain good solubility characteristics whereas four components are required for interpolyamides obtained from mixtures of different diamines and dibasic acids as the sole polyamide-forming reactants.

In addition to being soluble in formic acid and the phenols, the solvents for simple polyamides, the interpolymers are soluble in alcohols, especially when hot, and in alcohol-chlorinated hydrocarbon mixtures. They are also soluble in unsaturated alcohols, e. g., methallyl alcohol and methyl ethyl ethynyl alcohol. In addition to being more soluble than the simple polyamides, the interpolymers possess a wider range of compatibility with most modifying agents, e. g., plasticizers and resins. These characteristics together with inherent toughness make these interpolyamides of especial interest in the preparation of sheet materials and coating compositions.

The products of this invention can be used in the preparation of fibers for use in the textile art; e. g., in the preparation of knitted, woven and pile fabrics. Like the simple polyamides, these interpolyamides can be spun from melt or from solution by the wet or dry processes. In fact, the interpolymers are more suitable to spinning from solution than the simple polyamides because of their solubility in alcohols and other low boiling solvents.

The interpolymers are also useful in making laminated fabrics, e. g., for collars and cuffs. Such fabrics can be made by securing between two layers of high melting or infusible fabric a fabric or sheet composed of or impregnated with interpolymer, and then laminating the product by applying sufficient heat and pressure to cause the interpolymer to soften. They are useful in making felted articles since cold drawn filaments of the interpolymers tend to retract when heated. When the cold drawn interpolymer filaments or staple fibers are mixed with other fibers, e. g., cotton, and the mixture is heated, the retraction of the interpolymer filaments or staple fibers has a felting action on the mixture. The interpolyamides can also be used in the preparation of larger filaments, e. g., mohair substitutes, horsehair substitutes, bristles, etc. The large filaments (this term as used herein indicating generally both the oriented and unoriented filaments without regard to their length and thickness) are of utility in the preparation of racket strings, surgical sutures, dental floss, fishline leaders, fish lines, fish nets, etc.

Owing to the great toughness, pliability and clarity of sheet material prepared from the interpolyamides, they are especially useful in this form, particularly after they have been cold rolled. Typical uses of interpolymers in this form are safety glass interlayers, photographic films and wrapping foil. The good solubility characteristics of the interpolymers together with their other desirable properties, make them useful as ingredients in coating and impregnating compositions, e. g., for metals, cloth, paper, leather, etc. They are also useful in adhesive compositions, producing bonds of outstanding strength with wood and metal surfaces. Other uses are as electrical insulation, molding compositions, and golf ball covers. It is to be understood that in all these uses the interpolymers may be admixed with other materials, e. g., plasticizers, pigments, resins, cellulose derivatives, oils, and simple polyamides.

As many apparently widely different embodiments of this invention may be made without departing from the spirit and scope thereof, it is to be understood that the invention is not limited to the specific embodiments thereof except as defined in the appended claims.

What is claimed is:

1. An interpolymer obtained by polymerization of bifunctional reactants comprising at least one diamine having at least one hydrogen attached to each amino nitrogen atom, at least one polymerizable monoaminomonocarboxylic acid, and at least one dibasic carboxylic acid.

2. An interpolymer obtained by polymerization of bifunctional polyamide-forming reactants comprising a diprimary diamine, a polymerizable monoaminomonocarboxylic acid, and a dibasic carboxylic acid.

3. An interpolymer obtained by polymerization of a mixture of bifunctional polyamide-forming reactants comprising 6-aminocaproic acid, a diprimary diamine having a radical length of from 8 to 14, and a dicarboxylic acid having a radical length of 6 to 12.

4. A filament comprising the interpolymer set forth in claim 1.

5. A textile fiber comprising the interpolymer set forth in claim 1.

6. Sheet material comprising the interpolymer set forth in claim 1.

7. A process for making interpolymers which comprises heating at reaction temperature a polyamide-forming composition comprising bifunctional reactants comprising a diamine having at least one hydrogen atom attached to each amino nitrogen atom, a polymerizable monoaminomonocarboxylic acid, and a dibasic carboxylic acid.

8. A process for making interpolymers which comprises heating at reaction temperature a polyamide-forming composition comprising bifunctional reactants comprising a diprimary diamine, a polymerizable monoaminomonocarboxylic acid, and a dibasic carboxylic acid, and continuing the heating until the polymeric product obtained is capable of being formed into continuous filaments.

9. The process set forth in claim 7 in which the diamine is a diprimary diamine having a radical length of 8 to 14, the dibasic acid has a radical length of 6 to 12, and amino acid is 6-aminocaproic acid.

10. An interpolymer obtained by polymerization of bifunctional polyamide-forming reactants which consist of one diprimary diamine, one dibasic carboxylic acid, and one polymerizable monoaminomonocarboxylic acid, the weight ratio of the last-mentioned acid to the sum of the said diamine and first-mentioned acid being in the range of 10:90 to 90:10.

11. A process for making interpolymers which comprises heating at reaction temperature, under conditions permitting escape of by-product, a polyamide-forming composition comprising bifunctional reactants comprising 6-aminocaproic acid and, in substantially equimolecular proportions, a diprimary diamine having a radical length of 8 to 14 and a dibasic carboxylic acid having a radical length of 6 to 12.

WILMINGTON TRUST COMPANY,
*Executors of the Estate of Wallace Hume Carothers, Deceased.*
By ELWYN EVANS,
*Vice President.*